United States Patent
Price

[15] 3,658,411
[45] Apr. 25, 1972

[54] FOLDED PATH ZOOM LENS
[72] Inventor: William H. Price, Rochester, N.Y.
[73] Assignee: Eastman Kodak Company, Rochester, N.Y.
[22] Filed: Sept. 8, 1970
[21] Appl. No.: 70,169

[52] U.S. Cl. .............................. 350/184, 350/186, 350/202
[51] Int. Cl. ........................................................ G02b 15/18
[58] Field of Search .............................. 350/184, 186, 202

[56] References Cited

UNITED STATES PATENTS

| | | | |
|---|---|---|---|
| 3,152,211 | 10/1964 | Cox et al. | 350/184 |
| 1,145,132 | 7/1915 | Florian | 350/202 |
| 3,458,244 | 7/1969 | Klein | 350/184 X |

*Primary Examiner*—John K. Corbin
*Attorney*—Robert W. Hampton and D. Peter Hochberg

[57] ABSTRACT

A foldable zoom lens system including a simple triplet fixed portion and a zoom portion that includes a reversed-telephoto front objective with a mirror between the negative and positive components of this objective; a movable zooming component; and a compensating component. Another mirror is located between the zoom portion and the fixed portion to provide a compact zoom system that is folded twice. The front objective includes a fixed first component and a second component which is movable for focusing the lens for various subject distances.

1 Claim, 2 Drawing Figures

PATENTED APR 25 1972

3,658,411

WILLIAM H. PRICE
INVENTOR.

BY D. Peter Hochberg
Robert W. Hampton

ATTORNEYS 3,658,411

FOLDED PATH ZOOM LENS

CROSS-REFERENCE TO RELATED APPLICATIONS

Reference is made to commonly assigned and copending U.S. patent applications: Ser. No. 57,663, entitled "Camera Format," filed July 23, 1970 in the names of Dianne B. Ainsley and Arthur H. Crapsey; Ser. No. 57,661, entitled "Adjusting Mechanism for Zoom Lens System," filed July 23, 1970, in the name of Arthur H. Crapsey; and Ser. No. 70,170, entitled "Zoom Lens," filed Sept. 8, 1970 in the names of Kimball Straw and William H. Price.

BACKGROUND OF THE INVENTION

1. Field of the Invention

This invention relates to zoom lenses, and in particular to compact foldable zoom lenses particularly adapted for use in cinematographic cameras of the type having a reflex viewfinder.

2. Description of the Prior Art

Most prior art zoom lenses, particularly those in cinematographic cameras, occupy an objectionably large amount of space to provide adequate room for relative movement of the lens components. This difficulty is compounded by the fact that the largest dimension of such lenses usually must be added to one of the long camera dimensions, which tends to make the camera unwieldy. Motion picture cameras generally are arranged in this manner to align the optical axis of the lens perpendicular to the camera's exposure aperture or film gate which generally is parallel with the camera's shortest dimension.

A camera has been developed recently which has a rectangular parallelepiped shape with its shortest dimension being its depth dimension which extends forwardly from the photographer, as disclosed in the previously cited U.S. Pat. application Ser. No. 57,663.

To accomplish such a reorientation of camera dimensions, the film gate is arranged in a plane perpendicular to the object plane of the camera's lens system, which requires a folded optical system. The folding of the optical system has the further advantage of reducing the largest dimension of the lens to render it commensurate with the reduced depth dimension of the camera.

In addition, the focusing of prior zoom lenses for different subject distances has generally been accomplished by moving the front objective. Since this requires that the front component of the system be movable, the lens mounts must be large and cumbersome, and cannot be fully sealed against dust and moisture. These materials are objectionable in any optical system, and are particularly harmful in a zoom lens since zoom lenses contain many moving parts. A zoom lens is known comprising a fixed front component and movable rear zoom components, wherein focusing for different subject distances is accomplished by moving the zoom components, but this is done at the expense of changing the zoom range when the lens is focused.

SUMMARY OF THE INVENTION

An object of the present invention is to provide a folded zoom optical system having a short length.

Another object is to provide an improved zoom lens having a wide field angle.

A further object is to provide a compact folded zoom system for a cinematographic camera having a small depth dimension and including a reflex viewfinder.

A still further object is to provide a zoom lens system having adequate space between its components for reflectors that change the direction of its optical axis.

Yet another object is to provide a zoom lens adapted to focus on different subject distances without altering the zoom range, wherein the front lens component is fixed so that the lens can be sealed to protect the lens and camera interior against the entry of harmful materials such as dirt and moisture.

Other objects will be apparent from the description to follow and from the appended claims.

These objects are accomplished according to the preferred embodiment of the present invention by a foldable zoom lens system including a simple triplet fixed portion and a zoom portion that includes a reversed-telephoto front objective with a mirror between the negative and positive components of the objective; a movable zooming component; and a compensating component. Another mirror is located between the zoom portion and the fixed portion to provide a compact zoom system that is folded twice. A lens system according to the invention preferably is adapted to be focused for different subject distances by movement of the rear component of the front objective, which enables the front lens component of the system to be fixed so that the lens can be sealed against the entry of harmful materials.

BRIEF DESCRIPTION OF THE DRAWINGS

In the detailed description of the preferred embodiments, reference is made to the accompanying drawings, wherein.

DESCRIPTION OF THE PREFERRED EMBODIMENT

Figure 1:
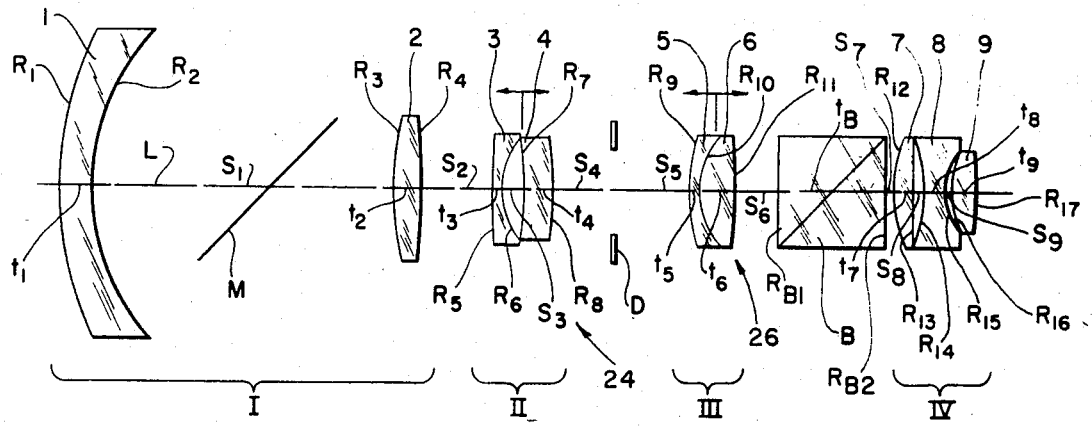
FIG. 1 is a sectional view of a zoom lens system according to the invention.

Referring to FIG. 1, a lens system according to the preferred embodiment of the invention is shown, the system including a zoom portion and a fixed portion. The zoom portion includes a reversed-telephoto objective I, a movable zooming component II for varying the magnification of the image, and an adjustable compensating component III that maintains the focus as the zooming component is adjusted. Behind the zoom portion is a beamsplitter B for directing a portion of the light from the zoom portion to a reflex viewfinder, shown in FIG. 2, and a fixed portion IV of the system for forming an image on the film plane of the camera in which the lens is incorporated. The front objective I includes a front negative meniscus component 1 spaced relatively widely from a rear positive component 2. This reversed telephoto arrangement provides space for a mirror M to fold the optical axis of the lens 90°. Since reversed telephoto lenses are characterized by a relatively short focal length, which is equal to or shorter than the back focus, the objective I also provides a relatively wide field angle without significantly increasing the lens diameter. Component 1 is fixed in relation to the fixed portion IV, so that the entire lens can be sealed against dust, moisture and other harmful materials. In addition, the fixed front component makes it possible to design a camera having an uncluttered front portion. Component 2 is adapted for axial movement to focus the lens for various subject distances, which enables front component 1 to be fixedly mounted. Movement of component 2 to focus the lens does not alter the zoom range of the lens.

The magnification of the image formed by the front objective I is varied by axial movement of the zooming component II which consists of an air spaced doublet including a negative meniscus element 3 concave to the rear and a weak negative meniscus element 4 concave to the front and in edge contact with the element 3.

The compensating component III is a cemented doublet including a front negative meniscus element 5 and a rear biconvex element 6. The components II and III are mechanically coupled for opposed linear motion so that when component II moves to change magnification, component III moves to maintain focus. Located between lens components II and III is a diaphragm D, and means (not shown) can be provided for adjusting the diaphragm aperture in response to displacement of the zoom components. Since the lens components II and III are located between the mirror M and the beamsplitter B, they can be moved to vary magnification without interference by reflectors. Thus, the system is provided with two folds in the optical path without significantly lengthening the axial length of the system, and these folds enable the largest physical dimension of the system to be reduced.

Many types of lenses could be employed with the zoom portion described above. In the disclosed embodiment the fixed portion IV is a simple airspaced triplet including front and rear positive elements 7 and 9, and a middle negative element 8.

A preferred example of a zoom system according to the invention may be constructed according to the following data:

| Element | N | V | Radii (mm) | Thicknesses Or Separations (mm) |
|---------|------|------|------------|-------------------------------|
| 1 | 1.50 | 67.0 | $R_1$= 35.6 | |
| | | | | $t_1$= 3.48 |
| | | | $R_2$= 24.1 | |
| | | | | $S_1$= 36.02 |
| | | | $R_3$= 32.6 | |
| 2 | 1.64 | 60.1 | | $t_2$= 2.73 |
| | | | $R_4$=−103.6 | |
| | | | | $S_2$=3.06 to 13.28 |
| | | | $R_5$= 51.8 | |
| 3 | 1.50 | 67.0 | | $t_3$= 0.90 |
| | | | $R_6$= 9.27 | |
| | | | | $S_3$= 2.17 |
| | | | $R_7$=−19.4 | |
| 4 | 1.50 | 67.0 | | $t_4$= 2.92 |
| | | | $R_8$=−54.8 | |
| | | | | $S_4$=17.74 to 7.52 |
| Diaphragm | | | $R_9$= 16.4 | $S_5$=7.2 to 1.53 |
| 5 | 1.72 | 29.3 | | $t_5$= 0.97 |
| | | | $R_{10}$= 7.92 | |
| 6 | 1.66 | 50.8 | | $t_6$= 4.37 |
| | | | $R_{11}$=−62.9 | |
| | | | | $S_6$=2.02 to 7.67 |
| | | | $R_{B1}$= ∞ | |
| B | 1.49 | 57.4 | | $t_B$= 11.13 |
| | | | $R_{B2}$= ∞ | |
| | | | | $S_7$= 0.85 |
| | | | $R_{12}$= 13.2 | |
| 7 | 1.69 | 56.2 | | $t_7$= 2.58 |
| | | | $R_{13}$= −267.8 | |
| | | | | $S_8$= 0.93 |
| | | | $R_{14}$= −19.3 | |
| 8 | 1.62 | 36.6 | | $t_8$= 2.73 |
| | | | $R_{15}$= 9.56 | |
| | | | | $S_9$= 0.83 |
| | | | $R_{16}$= 12.9 | |
| 9 | 1.61 | 58.8 | | $t_9$= 2.96 |
| | | | $R_{17}$=−33.4 | |

In the above table the lens elements are numbered from front to rear from 1 to 9 as shown in FIG. 1, N is the refractive index for each of the lens element materials for the D line of the spectrum, V is the index of dispersion for each of the elements, and R, t and S are the radii of curvature, thicknesses, and spacings of the lens elements, numbered by subscript from front to rear.

The zoom lens described in the above table has a constant back focal length of 7.0 mm. and an overall length of 105.6 mm. and it is well corrected for apertures up to at least $f/2.7$. The equivalent focal length varies from 9.95 mm. to 22.42 mm.

Figure 2:
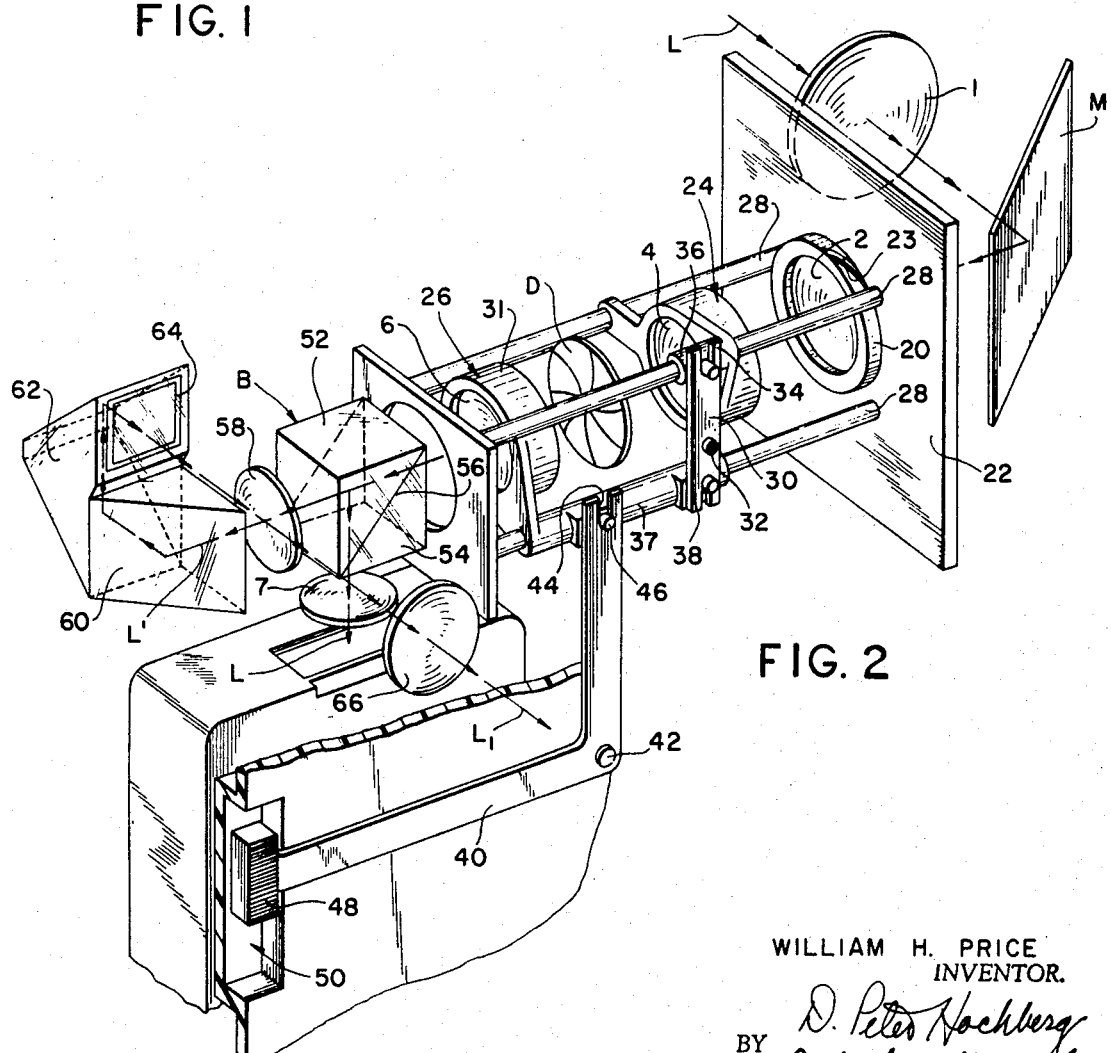
FIG. 2 is a partial perspective view of portions of a camera incorporating the lens system shown in FIG. 1.

In FIG. 2, an optical system according to the invention is shown mounted in a camera. Light from an object scene is transmitted by component 1 of the front objective to the mirror M which is positioned at an angle of 45° with respect to the plane of component 1. The mirror refects the light towards component 2 which is mounted with its plane at 90° with respect to the plane of component 1, so that the optical axes of components 1 and 2 are normal with respect to each other, i.e., the mirror puts a first fold in the system.

Component 2 is mounted by a ring 20 on a support plate 22 in the camera. Ring 20 is provided with a screw thread 23, and is axially movable in response to its rotation to focus the lens for different subject distances. The zoom component II and the rear compensating component III are mounted in barrel mounts 24 and 26, respectively, which are slidably mounted on slide rods 28 for movement along the optical axis L of the system.

To control the relative motion of the components II and III, the camera includes a zoom mechanism, which may take many forms known in the prior art. The zoom mechanism shown in FIG. 2 includes a linking lever 30 pivotally mounted on a pin 32 and having one end 34 pivotally connected to a sleeve 36 attached to barrel mount 24, and the other end 38 pivotally connected to a sleeve 37 attached to barrel mount 26 for effecting opposed linear motion of the components II and III. Thus, the relative movement of these components is determined by the location of fixed pivot pin 32 with respect to the ends of link 30. Movement is transmitted to the components by a bell crank 40 which is pivotally mounted on an axle 42. The bell crank 40 has a slot 44 at one end for receiving a pin 46, and a control knob 48 at the other end accessible from the exterior of the camera for actuation by an operator. The camera body is provided with a recess 50 whereby knob 48 need not extend beyond the surface thereof.

In response to vertical movement of knob 48, crank 40 pivots and urges sleeve 37 along slide rod 28 through the connection of pin 46 in slot 44. Such horizontal displacement of sleeve 37 is transmitted by link 30 to sleeve 36, which is urged in the opposite direction by the rotation of the link about its fixed pivot 32. The dimensions of link 30 are such that focus is substantially maintained throughout the zoom range. As indicated above, an adjustable diaphragm D is located between the components II and III. It should be noted that all of the movable parts of the lens are located between the folds of the system, thus simplifing the structure of the means for moving the various lens members.

The beamsplitter B is located behind the compensating component III, for transmitting a portion of the light from the zoom portion along an axis L' to a reflex viewfinder and for reflecting the remaining portion of that light through the fixed portion IV to the film plane of the camera. The beamsplitter B comprises a pair of prisms 52 and 54 having a semireflective interface 56 which transmits a portion of incident light and reflects the remaining portion at an angle of 90°. It may thus be seen that the beamsplitter B provides a second fold in the optical system. Light transmitted by the beamsplitter passes through a viewfinder relay 58 and is reflected by a prism 60 to an erecting prism 62 which in turn directs an upright image through a mask 64 and an eyepiece 66. The provision of a first fold at the front of the lens has made possible the incorporation of a compact prism arrangement for erecting the viewfinder image, since only three additional folds are required in the viewfinder system.

Thus, a compact zoom optical system has been provided which lends itself well to incorporation in a camera having a small depth, the system being of relatively simple construction and additionally making possible the use of a simple reflex viewfinder.

The invention has been disclosed in detail with particular reference to a preferred embodiment thereof, but it is to be understood that variations and modifications within the spirit and scope of the invention will be apparent to those skilled in the art to which the invention pertains.

I claim:

1. A compact motion picture camera having a film plane and a folded path zoom lens for forming an image of an object scene on the film plane, said zoom lens comprising from front to rear:

a front portion having a reversed-telephoto configuration, said front portion consisting of a front negative component having a first optical axis and a rear positive component having a second optical axis which intersects said first optical axis;

a reflective member positioned between said front component and said rear component so that the point of intersection of said first and second optical axes is on said reflective member and so that said reflective member directs light received from said front component through said rear component;

a zoom portion having a zoom optical axis coincident with said second optical axis and having at least one zooming component which is movable along said zoom optical axis for varying the magnification of said zoom lens and at least one compensating component which is movable along said zoom optical axis for maintaining the focus position of said zoom lens; and a rear fixed portion.

* * * * *